March 24, 1970   E. C. BEASON ET AL   3,502,889
PACKAGING MEANS WITH PHOTOCELL INTERRUPTION
Filed Aug. 1, 1966   2 Sheets-Sheet 1

INVENTOR
E. C. BEASON
G. E. MADER, JR.
BY *Young & Quigg*
ATTORNEYS

March 24, 1970   E. C. BEASON ET AL   3,502,889
PACKAGING MEANS WITH PHOTOCELL INTERRUPTION
Filed Aug. 1, 1966   2 Sheets-Sheet 2

INVENTOR
E. C. BEASON
G. E. MADER, JR.
BY
Young & Quigg
ATTORNEYS

United States Patent Office 3,502,889
Patented Mar. 24, 1970

3,502,889
PACKAGING MEANS WITH PHOTOCELL INTERRUPTION
Elmer C. Beason, Cincinnati, Ohio, and George E. Mader, Jr., Bartlesville, Okla., assignors to Phillips Petroleum Company, a corporation of Delaware
Filed Aug. 1, 1966, Ser. No. 569,167
Int. Cl. H01j 39/12
U.S. Cl. 250—222                                     6 Claims

ABSTRACT OF THE DISCLOSURE

Passage of an irregularly shaped object is detected by means of a light source and a triangularly shaped transparent prism having a base perpendicular to, and directly aligned with, said light source, and having an apex opposite said base, said apex concentrating the light onto a photoelectric cell. In this way, interruption of the light anywhere along the path through which the article passes by any portion of the irregularly shaped article varies the amount of light which is converged on the single photoelectric cell, thus allowing control of manipulative operations in response to this signal.

---

Figure 1:
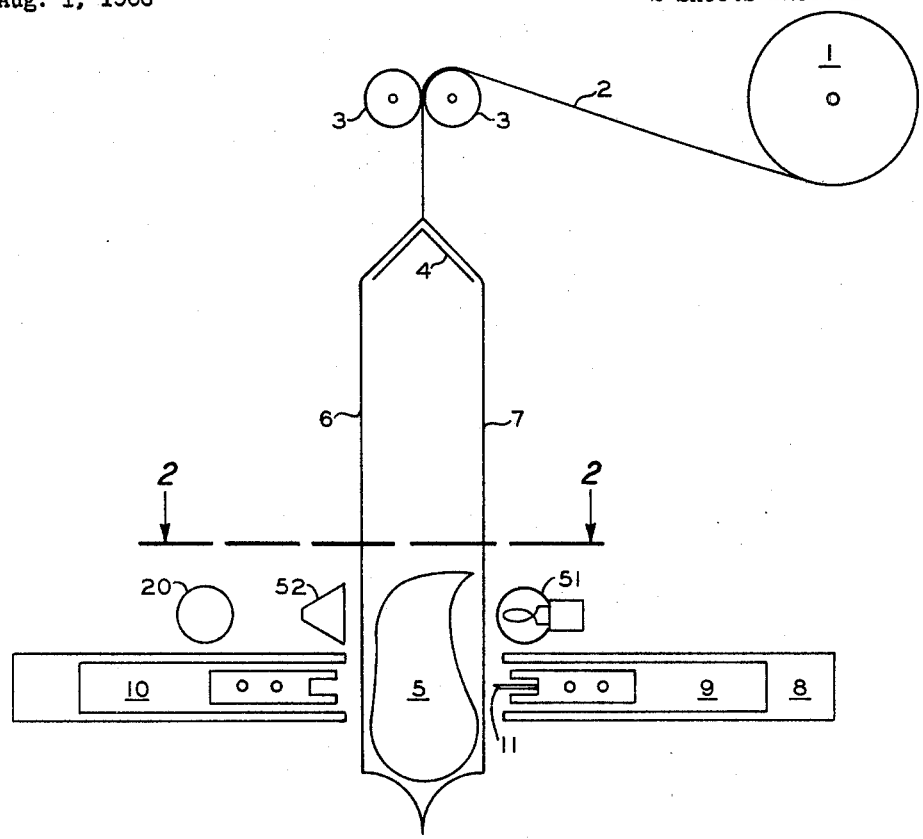

This invention relates to the packaging of articles with thermoplastic film. In one of its aspects it relates to a method and apparatus for sensing the absence of an article using a wide angle sensing means and activating a heat sealing means responsive to the absence of the article. In another of its aspects the invention relates to a heat sealing operation in which heat sealing is actuated by a photoelectric cell, the photoelectric cell being used to detect the presence or absence of an irregularly shaped article. In another aspect this invention relates to the use of a source of light, a light focusing means and a light sensing means to determine when an object is between the light and the focusing means.

Many articles today are sealed with transparent thermoplastic materials. The cost of packaging these articles can be substantially reduced if the sealing operation can be made substantially automatic so that a minimum of labor is required. One method for automatically or continuously making thermoplastic packages is to feed articles to the package between two thermoplastic sheets or a sheet which has been folded over, sealing the edges and making lateral seams where desired to complete the packages. If the articles are regular, the sealing means can be actuated periodically to make a standard size package. However, in the event that the articles are irregularly shaped and the packages must be of different sizes, then the operation almost dictates that it be done manually.

We have now discovered that a sealing operation can be done automatically with a photocell or a plurality of photocells according to our invention.

We have further discovered that a multiple number of light sensing devices can be reduced to one light sensing device by the use of a means for focusing light from a wide plane onto one light sensing device. (This light sensing device may be a photoresistor detector, a photovoltaic detector or a photoelectric detector. This light focusing device may be a triangular prism made of glass, methyl methacrylate polymer or any other material that will focus light from a large area to a small area.)

A single photocell is generally unsuitable for sensing the presence of an irregularly shaped article unless the same shaped article can be placed in the identical position each time. If the shape of the article varies from article to article, it is impossible to use a standard photocell in sensing the presence or absence of the article. For example, if it is desired to sense the absence of the article, it is possible that the article will be in the vicinity of the photocell yet not in the path of the light beam to be sensed by the photocell. We have now discovered that if at least a portion of an article, while the article is passing before a light source, is between the light source and a light gathering means that a single light sensing means can be used to sense the absence of the article. The light sensing means is adjusted so that a relay will not be tripped unless no part of the article is between the light source and the light gathering means. This invention can be used to trip the relay when only a small part of the article remains in front of the light to allow for delay in time required to make a seal or the required operation.

By various aspects of this invention, one or more of the following, or other, objects can be obtained.

It is an object of this invention to provide a method and apparatus for automatically heat sealing and packaging irregularly shaped articles.

It is a further object of this invention to provide an automatic heat sealing operation for packaging articles having varying sizes and shapes, the sealing being provided for thermoplastic sheets having the article therebetween and using a photocell for sensing the presence or absence of the article within the sheets.

It is a still further object of this invention to provide a means and method for sensing the presence of an irregularly shaped article in front of a photoelectric cell.

Other aspects, objects, and the several advantages of this invention are apparent to one skilled in the art from a study of this disclosure, the drawings and the appended claims.

According to the invention, there is provided a method and means for sensing the presence or absence of an irregularly shaped article if any part of the article passes between the light source and a light gathering means focused on a photoelectric cell. A light source is dispersed over a cross sectional plane across the path through which the article passes. Thus, some part of the article will pass through the plane between the source of light and the light gathering means. The light is sensed on the other side of the path by a suitable sensing means which senses all portions of the light beam within the plane across which the light source is dispersed. The sensing means can be a photocell or a plurality of photocells, or a photocell in combination with a light gathering source. The photocell or plurality of photocells can be adjusted so that the circuit will not be completed until all portions of the light beam are unobstructed or any preselected portion of the light beam is unobstructed from being sensed by the light gathering means. The term photocell includes a photoresistor, photovoltaic or photoelectric detector.

In one embodiment, the sensing means is used in a heat sealing operation wherein the photoelectric device actuates a heat sealer to seal thermoplastic packages containing irregularly shaped articles.

In another embodiment, a triangularly shaped prism is used as a light gathering means.

In another embodiment, a light gathering means of fiber optics is used as the light gathering means.

The invention will now be described with reference to the accompanying drawings in which FIGURE 1 is a schematic showing the operation of the invention as applied to heat sealing of irregularly shaped article packages.

Figure 2:
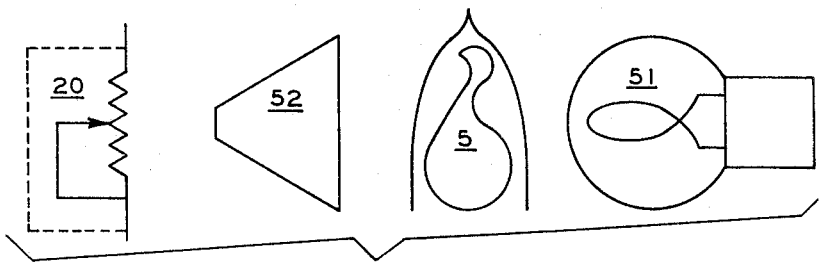
Figure 3:
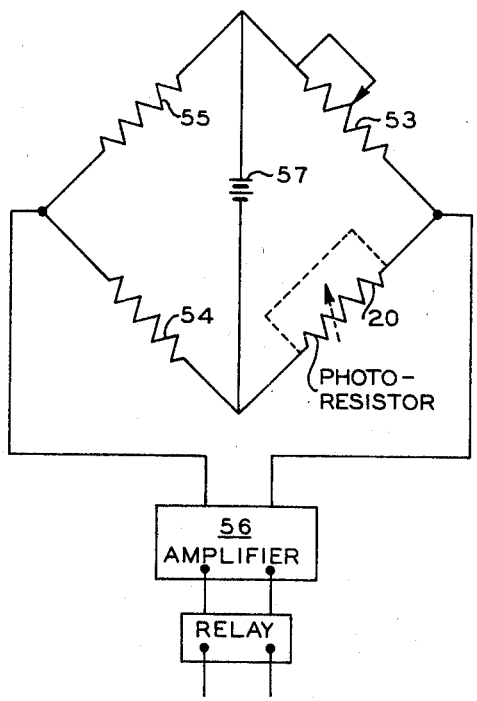
Figure 4:
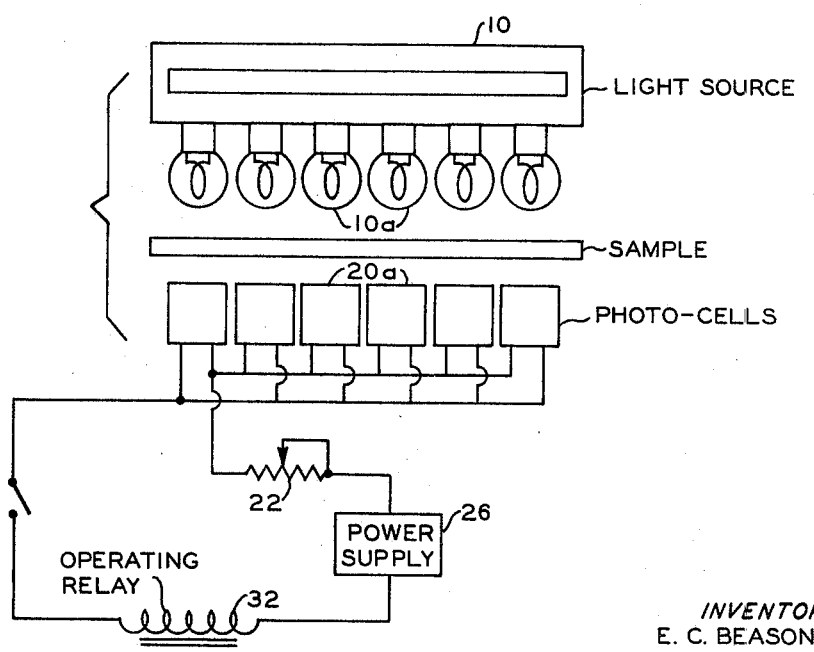

FIGURE 2 is a sectional view through 2—2 of FIGURE 1; FIGURE 3 is a schematic representation of a suitable circuit which could be used according to the invention; and FIGURE 4 is a schematic representation of a modification of the invention in which a plurality of photocells is used.

Referring now to FIGURES 1 and 2, a folded transparent plastic film roll 1 feeds the folded plastic film 2 over rolls 3. The rate of feed of plastic film 2 is regulated at a predetermined rate and is fed intermittently. Dividers 4 divide the folded film so that an object 5 can be placed between the sides 6 and 7 of the folded film. A suitable light source 51 is provided to shine an elongated beam of light through sides 6 and 7. The light source can be a fluorescent light or a plurality of light bulbs. A triangular prism 52 is placed across from light source 51 to gather light and focus the same onto photoresistor 20. A clamping means 8 is provided to force the sides 6 and 7 together so that heat sealers 9 and 10 can heat seal the sides together. Knife 11 is provided between two portions of heat sealing head 9 so that the film will be cut between the sealed edges. Heat sealers 9 and 10 are timed so that they will only be held against the sides of the films 6 and 7 long enough to seal the film. Heat sealers 9 and 10 along with knife 11 will then be retracted. The heat sealing of the sides 5 and 6 provides a pocket in which an article 5 can be placed. The completion of the heat sealing above article 5 will complete the package.

Heat sealers 9 and 10 can be provided with an L-shaped head to seal off all sides of the package or can be provided with a bar as shown in the drawing to seal only the top and bottom of the package thereby leaving an opening in the package.

Prism 52 functions as a light gathering means. Other light gathering means can be used such as a plurality of fibers which transmit light from one end to the other, the fibers being arranged in the shape of a prism. The prism can be made of any suitable material which will focus the light onto photoresistor 20.

In operation, heat sealers 9 and 10 come together to heat seal the sides of films 6 and 7 together. An article 5 is placed between sides 6 and 7 above the heat sealed edge. The heat sealers 9 and 10 are withdrawn and the film is fed at a uniform rate downwardly as seen in FIGURE 1. The presence of the article 5 in the path of light beam 51 will prevent a circuit from being completed, which circuit is dependent on photoresistor 20. When the article 5 has passed prism 52 and light 51, the full power of light from light source 51 passes through prism 52 onto photoresistor 20. Photoresistor 20 is connected to a variable resistor 53 seen in FIGURE 3 and to a resistor 54. Resistors 53 and 54 are also connected to resistor 55. Amplifier 56 is connected to the connector that connects resistor 53 to photoresistor 20 and to the connector that connects resistors 54 and 53. A source of current 57 is connected from one terminal to the connector that connects resistors 53 and 55 and from the other terminal to the connector between resistor 54 and photoresistor 20. When any part of the object is between light source 51 and prism 52, photoresistor 20 will not receive full power of light from light source 51. This lack of sufficient light will cause a resistance to the flow of current through photoresistor 20 to be decreased and maximum voltage will not be applied to amplifier 56. The amplifier 56 is so adjusted that it will not actuate the relay unless full voltage is applied thereto. After the object passes between prism 52 and light source 51, the current flowing through photoresistor 20 will be increased, which increase will supply the maximum voltage to amplifier 56, thereby actuating the relay which will cause in turn clamping means 8, heat sealers 9 and 10, and blade 11 to be actuated to seal and cut off a package. Obviously, a small time lag will be required to allow article 5 to pass through the line of movement of clamping means 8. Alternately, the photosensing means and light source 51 could be positioned beneath clamping means 8 to thereby actuate the clamping means as soon as the article passed through the clamping section. After the sealing operation, the clamp and heat sealers will be withdrawn and the cycle begins anew.

The relay described in FIGURE 3 can be any suitable relay such as Acro-Relay Model 301 from Acromag Incorporated, Detroit, Mich.

Referring now to FIGURE 4, a plurality of light sources 10a are provided in lieu of a single light beam 10 in FIGURES 1–3. The light sources 10a are directed to a plurality of photoelectric cells 20a which receive light from the corresponding source. The photoelectric cells are connected in parallel and the sensitivity adjusting device 22 is so adjusted so that the circuit will not be made unless light is received at each photocell 28. As is understood by one skilled in the art, shields can be used to block out light from other sources to the photocells 28.

Whereas, the above embodiment has been described as having a plurality of photocells connected in parallel, it is within the scope of the invention to provide a plurality of photocells 20a connected in series in a sensing circuit.

The material used in the heat sealing operation is any transparent material which when heat and pressure are applied will bond to itself. Suitable thermoplastic materials include heat sealable cellophane, polyethylene, polypropylene, polybutene-1 and copolymers thereof.

Whereas the invention has been described with reference to the use of the photoelectric sensing device as sensing the absence of an article, it is within the scope of the invention to use the photocell to sense the presence of an article and thereby actuate the heat sealing means responsive thereto.

Various types of photoelectric cells can be used. A suitable photoelectric cell is Clairex Model CL-2 from Clairex Corp., 50 W. 26th St., New York, N.Y.

Whereas the invention has been described with reference to a vertical feeding device, it is obvious that a horizontal conveyor belt-type system could be used in the practice of the invention. In such a device, the light beam would be dispersed across a vertical plane which crossed the path of the article.

Reasonable variation and modification are possible within the scope of the foregoing disclosure, the drawings and the appended claims to the invention without departing from the spirit thereof.

We claim:
1. An apparatus for sensing one of the presence or absence of an irregularly shaped article comprising:
   (a) a light source which projects a beam of light over a plane across the path through which said article passes,
   (b) a single photocell,
   (c) a triangularly shaped transparent prism having a base perpendicular to, and directly aligned with, said light source, and having an apex opposite said base, said prism being so disposed relative to said photocell as to focus light from said light source on said photocell, and
   (d) a sensing circuit adapted to be broken when a portion of said light beam is not received by said photocell, said circuit being connected to said photocell.

2. An apparatus according to claim 1 wherein said circuit actuates a heat sealing means to seal thermoplastic packages containing said irregularly shaped articles.

3. An apparatus according to claim 1 wherein said prism is made of methyl methacrylate polymer.

4. An apparatus according to claim 1 wherein said prism is made of strands of polymer fiber.

5. An apparatus according to claim 1 wherein said prism is made of glass.

6. An apparatus according to claim 1 wherein said light source comprises a fluorescent light.

References Cited

UNITED STATES PATENTS

| | | | |
|---|---|---|---|
| 2,578,882 | 12/1951 | Eash | 250—222 |
| 2,602,185 | 7/1952 | Johnson | 250—223 |
| 2,900,521 | 8/1959 | Eames | 250—221 |
| 3,242,341 | 3/1966 | Woodward | 250—221 |

RALPH G. NILSON, Primary Examiner

M. ABRAMSON, Assistant Examiner